(12) United States Patent
Goldberg

(10) Patent No.: US 9,174,083 B2
(45) Date of Patent: Nov. 3, 2015

(54) EXERCISE DEVICES, GUIDE/HOOK DEVICES, AND METHODS OF MAKING AND USING SAME

(76) Inventor: Elliott Goldberg, Scarsdale, NY (US)

( * ) Notice: Subject to any disclaimer, the term of this patent is extended or adjusted under 35 U.S.C. 154(b) by 488 days.

(21) Appl. No.: 13/483,994

(22) Filed: May 30, 2012

(65) Prior Publication Data

US 2013/0303336 A1 Nov. 14, 2013

Related U.S. Application Data

(63) Continuation-in-part of application No. 29/420,783, filed on May 12, 2012, now Pat. No. Des. 676,736.

(51) Int. Cl.
| | |
|---|---|
| *A63B 23/16* | (2006.01) |
| *A63B 21/00* | (2006.01) |
| *A63B 21/04* | (2006.01) |
| *A63B 21/055* | (2006.01) |

(52) U.S. Cl.
CPC .............. *A63B 23/16* (2013.01); *A63B 21/0004* (2013.01); *A63B 21/0414* (2013.01); *A63B 21/0557* (2013.01); *A63B 21/1438* (2013.01); *A63B 21/1469* (2013.01); *A63B 21/00189* (2013.01)

(58) Field of Classification Search
CPC .............. F16B 2/00; F16B 2/02; F16B 45/00; A47G 25/325; A63B 23/16; A63B 21/00189; A63B 21/0004; A63B 21/0557; A63B 21/1438; A63B 21/1469; A63B 21/0414; F16G 11/00

USPC ............. 482/121, 122, 129, 139, 148, 44–50, 482/124; 248/301, 304, 214, 215; 601/33, 601/40, 135

See application file for complete search history.

(56) References Cited

U.S. PATENT DOCUMENTS

| | | | | | |
|---|---|---|---|---|---|
| 2,459,287 | A | * | 1/1949 | Robbins et al. | 43/44.88 |
| 2,762,103 | A | * | 9/1956 | Hulett | 24/716 |
| 2,846,128 | A | * | 8/1958 | Fuller et al. | 223/91 |
| 3,606,316 | A | * | 9/1971 | Krewer | 482/47 |
| 3,790,045 | A | * | 2/1974 | Rigel et al. | 223/87 |
| 3,888,448 | A | * | 6/1975 | Rowland | 248/328 |
| 3,996,649 | A | * | 12/1976 | Podd | 24/598.1 |
| 4,097,015 | A | * | 6/1978 | Frishman | 248/339 |
| 4,452,161 | A | * | 6/1984 | McCoy | 114/39.18 |
| 5,136,911 | A | * | 8/1992 | Wyss | 84/468 |

(Continued)

FOREIGN PATENT DOCUMENTS

WO    WO 2007036725 A1 * 4/2007

OTHER PUBLICATIONS

Fabrication Enterprises catalog, 2011-2012, p. 20 (enclosed herewith), White Plains, NY; catalog first distributed to public about Jan. 2011.

*Primary Examiner* — Loan H Thanh
*Assistant Examiner* — Sundhara Ganesan
(74) *Attorney, Agent, or Firm* — Weiner & Burt, P.C.; Irving M. Weiner; Pamela S. Burt

(57) ABSTRACT

An exercise device with a body having recesses for receiving fingers of a user. The body can be squeezable or not. An elastic band surround the periphery of the body, and permits the user to move fingers against the tension of the elastic band. A guide/hook device prevents accidental separation of the guide/hook device from the body, and prevents accidental separation of the elastic band from the guide/hook device.

1 Claim, 7 Drawing Sheets

(56) References Cited

U.S. PATENT DOCUMENTS

| | | | |
|---|---|---|---|
| 5,669,242 A * | 9/1997 | Cayton | 63/21 |
| 5,927,895 A * | 7/1999 | Watanabe | 403/353 |
| 6,085,449 A * | 7/2000 | Tsui | 40/1.6 |
| 6,179,751 B1 * | 1/2001 | Clears | 482/48 |
| 6,195,851 B1 * | 3/2001 | Vollebregt et al. | 24/369 |
| 6,213,918 B1 * | 4/2001 | Rogers, Jr. | 482/44 |
| 6,228,001 B1 * | 5/2001 | Johnson et al. | 482/48 |
| 6,443,409 B1 * | 9/2002 | Zanzucchi | 248/218.3 |
| 6,792,653 B2 * | 9/2004 | Protz | 24/485 |
| 6,817,967 B1 * | 11/2004 | Ott et al. | 482/48 |
| 7,047,604 B2 * | 5/2006 | Axel | 24/599.1 |
| 7,381,156 B2 | 6/2008 | Silagy | |
| D676,736 S * | 2/2013 | Goldberg | D8/367 |
| 2004/0123434 A1* | 7/2004 | Protz | 24/485 |
| 2005/0109904 A1* | 5/2005 | Diggle et al. | 248/304 |
| 2007/0046050 A1* | 3/2007 | Metzger et al. | 294/26 |
| 2011/0283486 A1* | 11/2011 | Boonstra et al. | 24/265 H |
| 2012/0039069 A1* | 2/2012 | Schrimmer | 362/103 |
| 2013/0091756 A1* | 4/2013 | Stahl | 43/44.92 |
| 2013/0213735 A1* | 8/2013 | Dehondt et al. | 182/3 |
| 2014/0011646 A1* | 1/2014 | Wu | 482/122 |

* cited by examiner

EXERCISE DEVICES, GUIDE/HOOK DEVICES, AND METHODS OF MAKING AND USING SAME

CROSS-REFERENCE TO RELATED APPLICATIONS

This application is a continuation-in-part of and claims priority from U.S. Design patent application 29/420,783 filed May 12, 2012 now U.S. Pat. No. 676,736.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates to exercise devices, guide/hook devices, and methods of making and using same.

More particularly, the present invention relates to exercise devices, guide/hook devices, and methods of making and using same, wherein accidental removal of an elastic band used therewith is minimized or eliminated.

It is a desideratum of the present invention to avoid the animadversions of conventional devices, and at the same time to provide very effective. convenient and unique exercise devices, guide/hook devices, and methods of making and using same.

SUMMARY OF THE INVENTION

The present invention provides a guide/hook device comprising: an upper structure; a lower structure connected to said upper structure; said upper structure including a tortuous member; said tortuous member having an upper portion, a bottom portion, a first side portion interconnecting said upper portion and said bottom portion, and a second side portion connected to said bottom portion and being separated from said upper portion by a first predetermined gap; said upper portion having a depending intermediate member; a guide cavity portion formed by said upper portion, said first side portion, and said depending intermediate member; a tortuous channel connecting said predetermined gap and said guide cavity; said tortuous channel being formed by said second side portion, said bottom portion, said first side portion, and said depending intermediate member; and said lower structure includes means for securement of said guide/hook device to an external body and for holding said guide/hook device within the material of the external body.

The invention also provides an exercise device comprising: a body having a top surface, a bottom surface, and a sidewall extending about said top and bottom surfaces between said top and bottom surfaces; said sidewall including at least one recess formed therein; an elastic member positioned about the periphery of the body; said elastic member extending across the at least one recess to enclose the at least one recess such that the enclosed recess is dimensioned and configured to receive at least a portion of an extremity of a user; at least one guide/hook device for receiving said elastic member; and said at least one guide/hook device comprising: an upper structure; a lower structure connected to said upper structure; said upper structure including a tortuous member; said tortuous member having an upper portion, a bottom portion, a first side portion interconnecting said upper portion and said bottom portion, and a second side portion connected to said bottom portion and being separated from said upper portion by a first predetermined gap; said upper portion having a depending intermediate member; a guide cavity portion formed by said upper portion, said first side portion, and said depending intermediate member; a tortuous channel connecting said predetermined gap and said guide cavity; said tortuous channel being formed by said second side portion, said bottom portion, said first side portion, and said depending intermediate member; and said lower structure includes means for securement of said guide/hook device to an external body and for holding said guide/hook device within the material of the external body.

The invention also provides an exercise device comprising: a squeezable resilient ball having at least one recess formed therein; an elastic member positioned about the periphery of the ball; said elastic member extending across the at least one recess to enclose the at least one recess such that the enclosed recess is dimensioned and configured to receive a finger of a user; at least one guide/hook device for receiving said elastic member; and said at least one guide/hook device comprising: an upper structure; a lower structure connected to said upper structure; said upper structure including a tortuous member; said tortuous member having an upper portion, a bottom portion, a first side portion interconnecting said upper portion and said bottom portion, and a second side portion connected to said bottom portion and being separated from said upper portion by a first predetermined gap; said upper portion having a depending intermediate member; a guide cavity portion formed by said upper portion, said first side portion, and said depending intermediate member; a tortuous channel connecting said predetermined gap and said guide cavity; said tortuous channel being formed by said second side portion, said bottom portion, said first side portion, and said depending intermediate member; and said lower structure includes means for securement of said guide/hook device to said squeezable resilient ball and for holding said guide/hook device within the material of the squeezable resilient ball.

It is a primary object of the present invention to provide a guide/hook device which can be securely affixed to soft, resilient, elastic, pliable, and/or non-rigid bodies.

Another object of the present invention is to provide a such a guide/hook device which impedes and/or eliminates accidental removal of an elastic member from the guide/hook device with which the elastic member operates.

A further object of the present invention is to provide an exercise device as described above which includes guide/hook devices that can be securely affixed to soft, resilient, elastic, pliable, and/or non-rigid bodies.

Yet another object of the present invention is to provide an exercise device as described above which includes guide/hook devices that impedes and/or eliminates accidental removal of the elastic member from the guide/hook devices with which the elastic member operates.

Yet another object of the present invention is to provide an exercise device and/or guide/hook device as described above wherein the lower structure includes a substantially horizontal member, said at least one flange structure, and at least one member connecting said substantially horizontal member to said at least one flange member; said upper structure is connected to said substantially horizontal member; and said at least one flange structure is V-shaped having its apex facing away from said upper structure to impede loosening and/or removal of said device from the external body or ball.

Another object of the invention is to provide an exercise device and/or guide/hook device wherein said lower structure includes a substantially horizontal member, a plurality of said flange structures, and at least one member connecting said substantially horizontal member to said plurality of flange members; said upper structure is connected to said substantially horizontal member; and each said flange structure is V-shaped having its apex facing away from said upper structure to impede loosening and/or removal of said device from the external body or ball.

Another object of the invention is to provide an exercise device and/or guide/hook device wherein said depending intermediate member is provided with a plurality of protuberances which depend into said tortuous channel and which provide a plurality of second predetermined gaps between said bottom portion and said plurality of protuberances.

Another object of the invention is to provide an exercise device as described above wherein the elastic member extends across the at least one recess to enclose the at least one recess such that the enclosed recess is dimensioned and configured to receive a finger of a user.

Another object of the invention is to provide an exercise device as described above wherein the at least one recess includes a plurality of recesses; and said elastic band extends across each of the recesses.

Another object of the invention is to provide an exercise device as described above including a shallow groove extending along the sidewall of the body; said shallow groove being dimensioned and configured to receive said elastic band.

Other objects, advantages, and features of the present invention will become apparent to those persons skilled in this particular area of technology and to other persons after having been exposed to the present patent application when read in conjunction with the accompanying patent drawings.

DETAILED DESCRIPTION OF THE INVENTION

The description of the embodiments which follows, together with the accompanying drawings, should not be construed as limiting the invention to the examples shown and described, because those skilled in the art to which this disclosure pertains will be able to devise other forms thereof within the ambit of the appended claims.

Like components are referred to by the same reference numbers.

Figure 1:
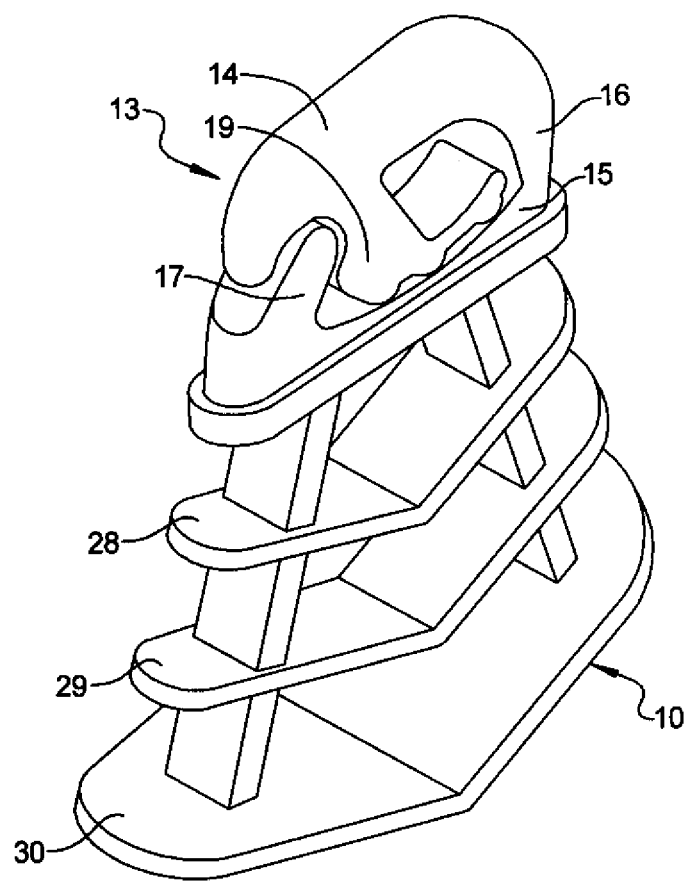
FIG. 1 is a perspective view of a guide/hook device of the present invention.
Figure 2:
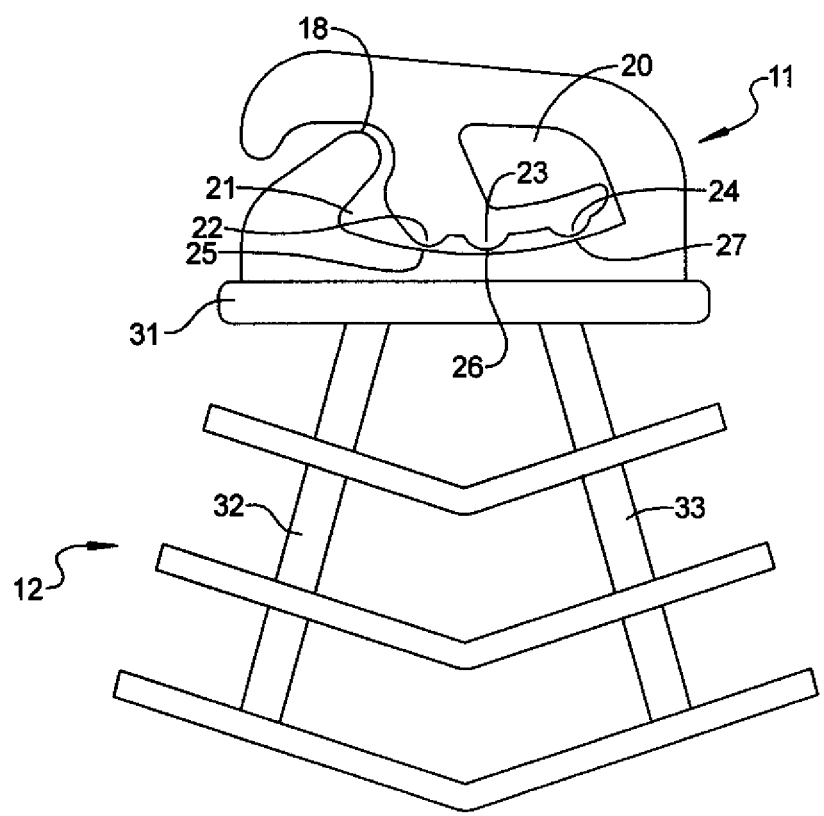
FIG. 2 is right side elevational view of the device depicted in FIG. 1.
Figure 3:
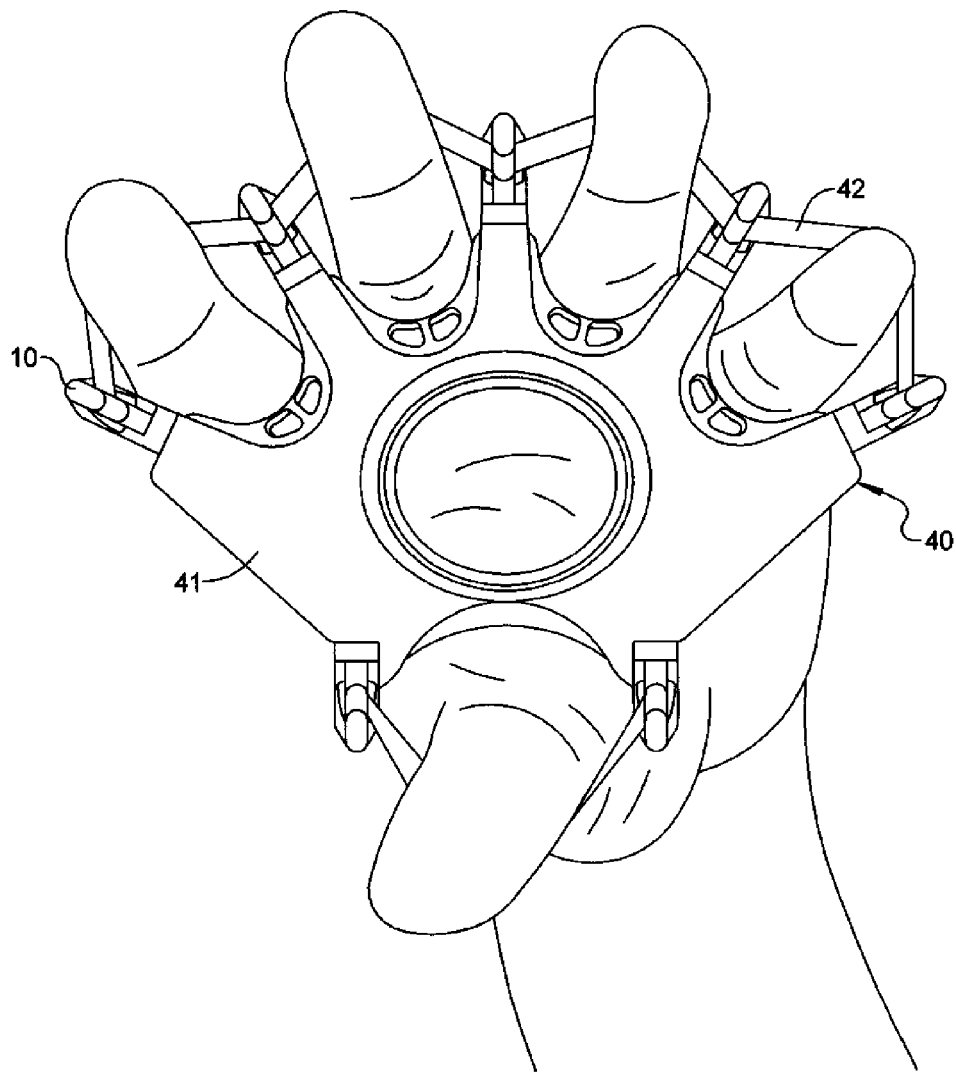
FIG. 3 is a perspective view of a first embodiment of an exercise device of the present invention shown in use.
Figure 4:
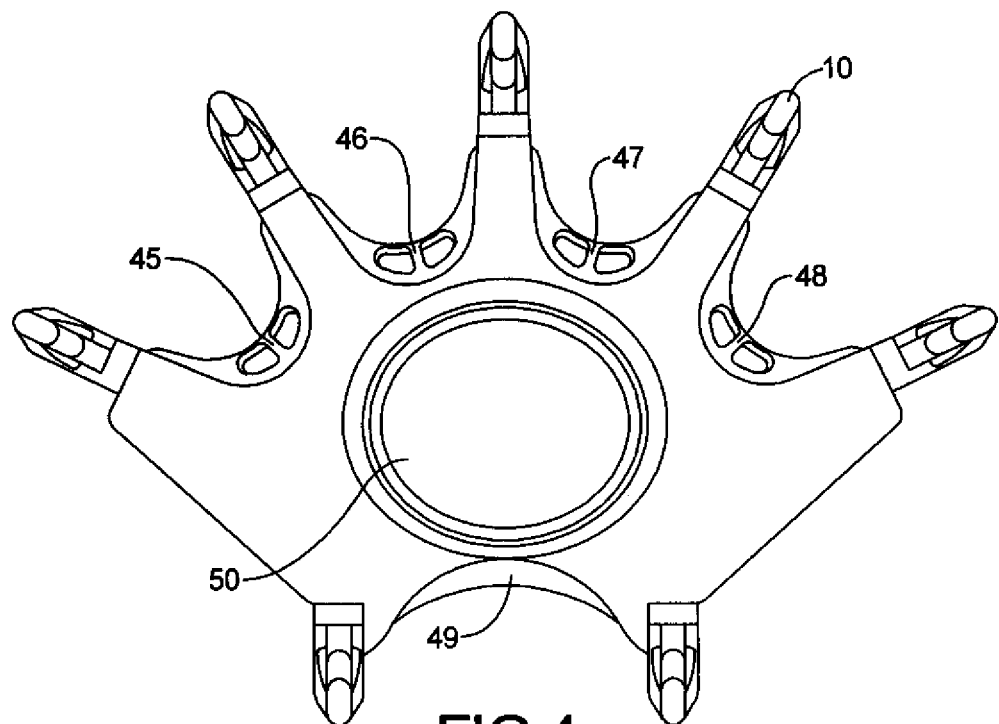
FIG. 4 is a plan view of the FIG. 3 device with the elastic member removed.
Figure 5:
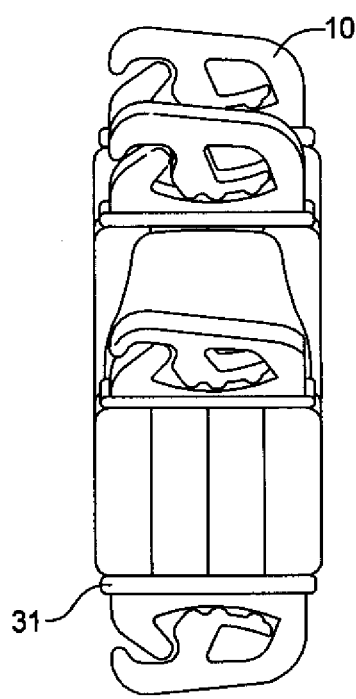
FIG. 5 is a right side elevational view of the FIG. 4 device.

With reference to FIGS. 1 and 2, there is shown a guide/hook device 10 in accordance with the invention.

The guide/hook device 10 includes an upper structure 11, and a lower structure 12 connected to the upper structure 11.

The upper structure 11 including a tortuous member 13 which has an upper portion 14, a bottom portion 15, a first side portion 16 interconnecting the upper portion 14 and the bottom portion 15, and a second side portion 17 connected to the bottom portion 15 and being separated from the upper portion 14 by a first predetermined gap 18.

The upper portion 14 has a depending intermediate member 19.

A guide cavity portion 20 is formed by the upper portion 14, the first side portion 16, and the depending intermediate member 19.

A tortuous channel 21 connects the first predetermined gap 18 and the guide cavity 20.

The tortuous channel 21 is formed by the second side portion 17, the bottom portion 15, the first side portion 16, and the depending intermediate member 19.

The depending intermediate member 19 is provided with a plurality of protuberances 22, 23 and 24 which depend into the tortuous channel 21 and which provide a plurality of second predetermined gaps 25, 26 and 27 between the bottom portion 15 and the plurality of protuberances 22, 23 and 24.

The lower structure 12 has a plurality of flange structures 28, 29 and 30 for securement of the guide/hook device 10 to an external body.

The lower structure 12 also includes a substantially horizontal member 31 and two members 32 and 33 connecting the substantially horizontal member 31 to the flange members 28, 29 and 30.

The upper structure 11 is connected to the substantially horizontal member 31.

Each flange structure 28, 29 or 30 is V-shaped having its apex facing away from the upper structure 11 to impede loosening and/or removal of the device 10 from the external body.

With reference to FIGS. 3-7, there is shown a first embodiment of an exercise device 40 in accordance with the present invention.

As seen in FIG. 3-7, the exercise unit 40 includes a body 41, and a removable elastic member 42 extending around the periphery of body 41.

The body 41 has recesses 45, 46, 47, 48 and 49 configured and dimensioned to receive each of the five fingers of a user.

A central opening 50 can optionally be provided as an alternative location for positioning the user's thumb during exercising.

The material of construction of body 41 is not critical.

Body 41 can be made, for example, from plastic, rubber, metal, ceramic, wood, or the like.

The manner of construction of body 41 is likewise not critical. Body 41 can be molded, cast, stamped, carved, or formed using any other technique.

Body 41 can be a unitary structure or can be made from two or more pieces that are, for example, snap fit together.

For example, body 41 may be a unitary structure that is molded or cast from a latex-free synthetic material.

Guide/hook devices 10 are positioned as shown in FIGS. 3-7.

Figure 6:
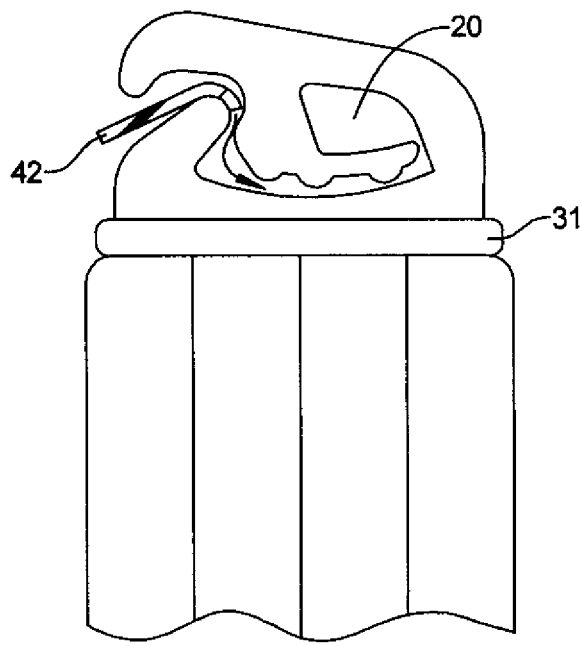
FIG. 6 is a enlarged fragmentary view of FIG. 5 showing the elastic member entering the guide/hook device
Figure 7:
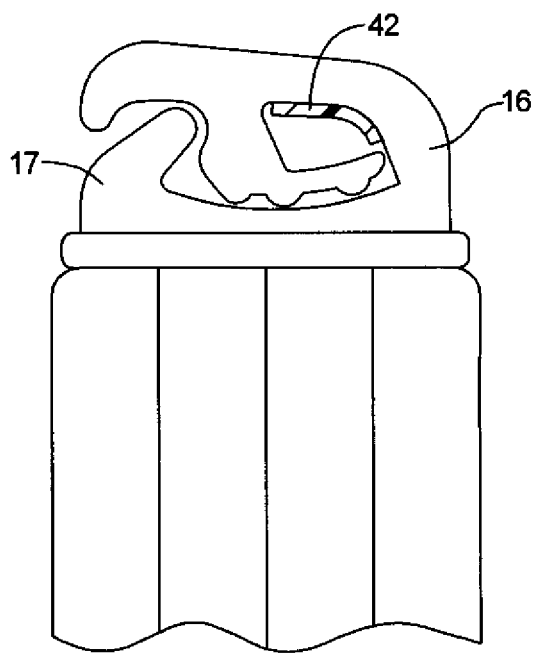
FIG. 7 is a view similar to FIG. 6 showing the elastic member disposed in the guide cavity of the guide/hook device.

As seen best in FIGS. 6 and 7, guide/hook devices 10 allow insertion therein and removal therefrom of elastic member 42, but most importantly prevent accidental removal of the elastic member 42 after it has been positioned in the guide cavity 20.

This is accomplished by the unique dimensioning and configuration of the above-described elements of the upper structure 11 of the guide/hook device 10.

The guide/hook device 10 can be made from any material, including but not limited to the materials listed above from which body 41 can be made.

The guide/hook device 10 can be formed separately, or as a unitary structure with body 41. For example, the guide/hook device 10 can be molded from the same material as is used to mold the body 41.

Alternatively, the guide/hook devices 10 can be made from a material different from the material from which body is made.

With reference to FIGS. 8-11, there is shown a second embodiment of an exercise device 70 in accordance with the present invention.

Figure 10:
FIG. 10 is a perspective view of the FIG. 8 device shown being squeezed by a user.
Figure 11:
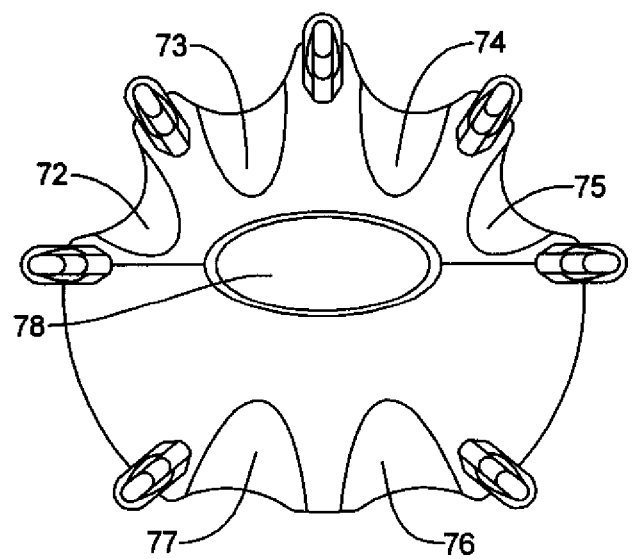
FIG. 11 is plan view of the second embodiment shown with the elastic member removed.

As seen in FIGS. 10 and 11, the exercise unit 70 includes a squeezable body ball 71, and a removable elastic member 42 extending around the periphery of ball 71.

The ball 71 has recesses 72, 73, 74, 75, 76 and 77 configured and dimensioned to receive fingers of a user, and located as shown in FIG. 11.

A substantially flat portion 78 can also be provided.

The guide/hook devices 10 are embedded within body 41 or ball 71.

For example, the guide/hook devices 10 may be placed partially within a mold, and the body 41 or ball 71 is molded around the lower structure 12 to embed the guide/hooks 10 within body 41 or ball 71.

Those skilled in the art will readily envision other techniques for connecting the guide/hook devices 10 to the body 41 or ball 71.

Elastic member 42 is positioned around the periphery of body 20 or ball 41.

Elastic member 42 is, essentially, a rubber band that serves as a means of providing resistance during exercise.

Elastic member 42 has a degree of elasticity that provides resistance within a range desirable for finger/hand exercise and can undergo a number of stretchings, while repeatedly reassuming its original unstretched configuration upon release of the stretching force.

While elastic member 42 can be made from latex or natural rubber, in certain embodiments elastic member 42 can advantageously be made from non-allergenic synthetic elastomers.

Such materials are known to those skilled in the art.

In certain embodiments, thermoplastic elastomers suitable for forming elastic member 42 are capable of being extruded in the form of very thin films, particularly from about 0.1 mm to 1.25 mm thick and can have an elongation to break of about 300% to about 900%, a tensile strength of about 10 to about 30 MPa, and a modulus at 300% elongation of about 1 to 5 MPa.

Illustrative examples of such thermoplastic elastomers include styrene-butadiene-styrene block copolymers, styrene-ethylenelbutylene-styrene block copolymers (SEBS) such as the type commonly available under the tradename KRATON® available from Kraton Polymers U.S. LLC, Houston Tex.

Also useful in forming elastic member 42 are polyolefin elastomers, such as the type sold under the tradename ENGAGE® by DuPont Dow Elastomers, L.L.C., Wilmington, Del. (See generally, U.S. Pat. No. 5,945,060, the entire disclosure of which is incorporated herein by this reference.).

Other suitable materials for forming elastic member 42 will be apparent to those skilled in the art.

As noted above, elastic member 42 can be removed from body 20 or ball 41.

This permits one elastic member 42 to be replaced with another elastic member having a different resistive force.

In this manner, each individual user can begin his/her exercise regimen at the appropriate level of resistance and progressively increase the intensity of the exercise by increasing the resistance level of the elastic member.

Elastic members 52 thus advantageously can be provided in a variety of thicknesses, with different thicknesses of material providing different degrees of resistance.

In this way, an elastic member can be pre-selected to provide a desired degree of resistance.

Alternatively, the composition of the elastic member and/or the production parameters can be selected to produce elastic members of varying levels of resistance.

Furthermore, coloring matter can be provided during manufacture to produce colored elastic members.

Different colors can be indicative of different levels of resistance.

In one illustrative coloring scheme, a yellow elastic member would indicate a low level of resistance, with red, green, blue and black indicating progressively greater levels of resistance.

Optionally, the elastic members can also be printed or otherwise patterned with informational or aesthetic ornamentation.

For example, one or both surfaces of elastic member 42 can be textured, such as by embossing them using a textured plate.

Such texturing can be purely functional (e.g., to provide a more grippable surface) or the texturing can also serve informational purposes (e.g., printed with indicia indicating the number of pounds of resistance which it provides) and/or aesthetic purposes.

FIGS. 3, 8, 9 and 10 show the manner of use of exercise device 40 and 70.

Initially, the user places each finger within a recess between elastic member 42 and body 41 or ball 71.

The user then moves one or more fingers in a direction away from body 41 or 71 to stretch elastic member 42.

Figure 8:
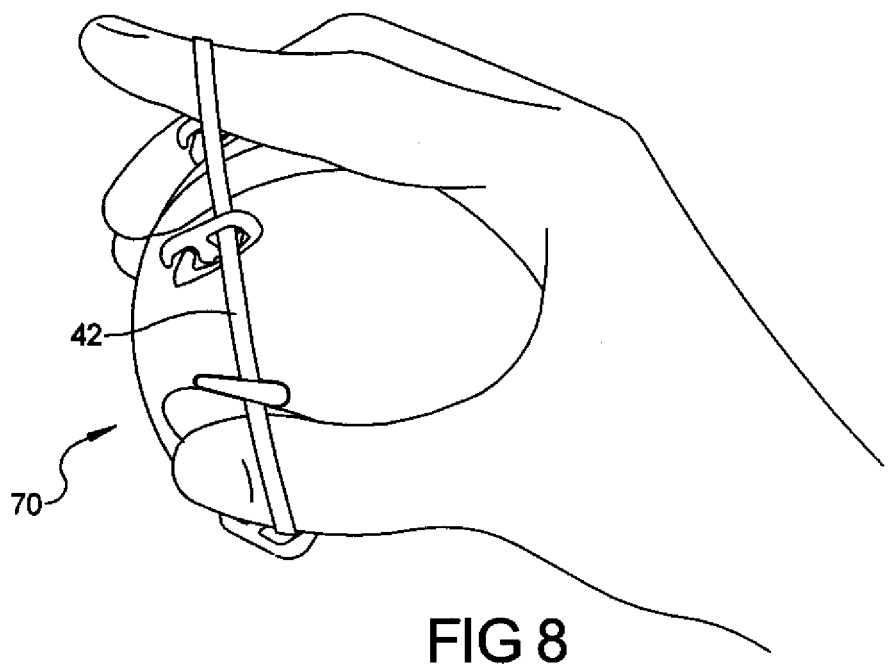
FIG. 8 is a perspective view of a second embodiment of an exercise device of the present invention shown when exercising an index finger.
Figure 9:
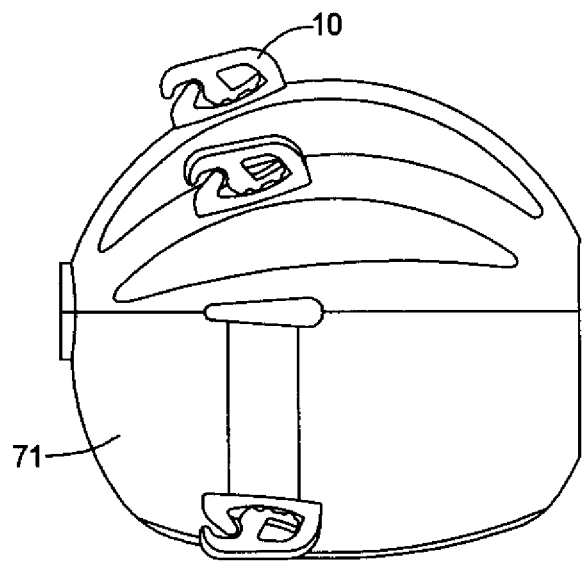
FIG. 9 is a view of the FIG. 8 device with the elastic member removed.

For example, as shown in FIG. 8, the user can move his/her index finger while maintaining all other fingers against ball 71.

It should of course be understood that the user may move two or more fingers simultaneously in a direction away from body 41 or ball 71 to exercise two or more fingers simultaneously.

Once a user has exercised sufficiently to stretch an elastic member of a particular resistance, the elastic member can be easily removed from the periphery of body 41 or ball 71 by sliding elastic member 42 out from under guides 10 and can be replaced with an elastic member of higher or lower resistance.

The guide/hook device 10 prevent accidental separation of the guide/hook device from the body or ball, and prevents accidental separation of the elastic band 42 from the guide/hook device 10.

There have been illustrated in the accompanying drawings and described hereinabove only two possible unique and novel embodiments of the present invention which can be practiced and constructed in many different embodiments, configurations, materials, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth hereinbelow.

The invention claimed is:

1. A guide/hook device, comprising:
an upper structure;
a lower structure connected to said upper structure;
said upper structure including a tortuous member;
said tortuous member having an upper portion, a bottom portion, a first side portion interconnecting said upper portion and said bottom portion, and a second side portion connected to said bottom portion and being separated from said upper portion by a first predetermined gap;
said upper portion having a depending intermediate member;
a guide cavity portion formed by said upper portion, said first side portion, and said depending intermediate member;
a tortuous channel connecting said predetermined gap and said guide cavity;
said tortuous channel being formed by said second side portion, said bottom portion, said first side portion, and said depending intermediate member;
said lower structure includes securement means for embeddedly securing said guide/hook device into and within an external body and for holding said guide/hook device within the external body;
said lower structure includes a substantially horizontal member;
said bottom portion of said tortuous member and said tortuous channel being disposed adjacent to and above said substantially horizontal member of said lower structure;
said securement means includes at least one flange structure and at least one member connecting said substantially horizontal member to said at least one flange member;
said upper structure is connected to said substantially horizontal member;
said at least one flange structure is substantially V-shaped having its apex facing away from said upper structure to impede loosening and/or removal of said device from embedded securement in the external body; and
said depending intermediate member is provided with a plurality of protuberances which depend into said tortuous channel and which provide a plurality of second predetermined gaps between said bottom portion and said plurality of protuberances.

* * * * *